Figure 1:
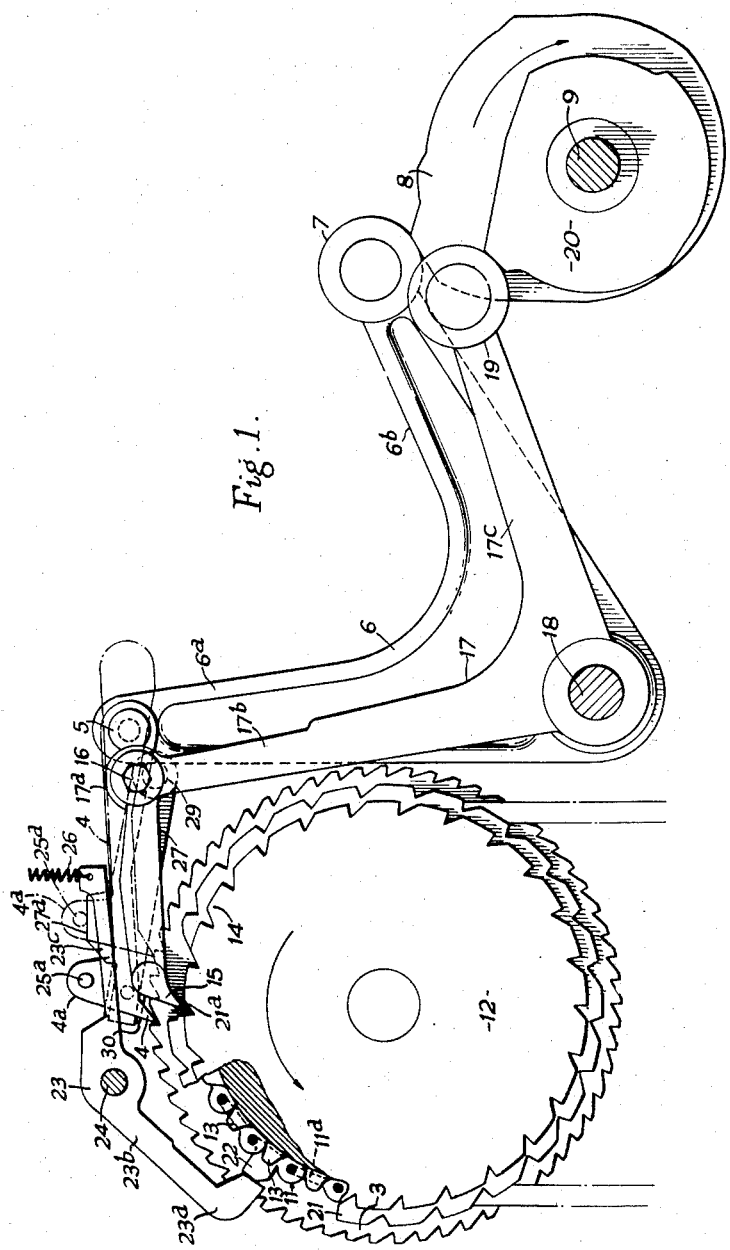

July 8, 1958 — A. P. SAUNDERS — 2,841,970
CONTROL MECHANISMS FOR KNITTING MACHINES
Filed June 20, 1956 — 3 Sheets-Sheet 3

United States Patent Office 2,841,970
Patented July 8, 1958

2,841,970

CONTROL MECHANISMS FOR KNITTING MACHINES

Alfred Percy Saunders, Leicester, England, assignor to Wildt and Company Limited, Leicester, England, a British company Application June 20, 1956, Serial No. 592,580

Claims priority, application Great Britain June 24, 1955

9 Claims. (Cl. 66—155)

This invention relates to control mechanisms for automatic knitting machines, and has reference exclusively to such mechanisms of the kind comprising, in combination, a main intermittently rotatable control drum fitted with prearranged cams or the like from which the various automatically operated components, devices and mechanisms of the machine are actuated, through intermediate connections, pawl and ratchet gearing for racking round the said control drum, and an intermittently movable timing chain from which the racking movements of the drum are initiated at required times.

In a control mechanism of this kind, the main control drum has secured to one end thereof a peripherally toothed ratchet wheel arranged to co-operate with a rack pawl which is adapted to be reciprocated from a continuously rotating lobe cam, e. g. through the medium of a bell crank lever. The lobe cam is driven in suitable timed relation with the knitting machine, usually at a speed ratio of 2:1 with respect to the main drive shaft, and a bluff member, influenced by lugs or studs on prearranged links of the timing chain, is provided to control engagement of the pawl with the ratchet wheel.

Now heretofore in a control mechanism of the kind concerned, the timing chain has been furnished with lugs or studs of different heights which have functioned to move the bluff member to respectively different positions for the purpose of controlling engagement of the operative extremity of the rack pawl with the teeth suchwise as to determine the angular extents to which the control drum is to be racked at required times. Thus, in one well-known prior arrangement, a high lug or stud on the timing chain serves by action on a toe or the bluff member, to move the latter into such a position as to permit the pawl to engage the ratchet teeth early so that on the appropriate operative stroke of the pawl a double rack is imparted to the control drum, i. e. a rack equivalent to twice the pitch of the ratchet teeth. A low lug or stud on the chain, on the other hand, so disposes the bluff member as to delay engagement of the pawl with the teeth to the extent that only half the operative stroke of the pawl is effective and, as a consequence, a single rack only is imparted to the drum, that is to say an angular movement equivalent to the pitch of the teeth. In this arrangement, moreover, whenever the toe of the bluff member moves off a chain lug or stud and drops onto the chain links, the bluff member moves to wholly bluff the pawl, i. e. raise its operative extremity clear of the ratchet wheel, so that the pawl reciprocates idly without racking round the control drum.

Accordingly, and as is well known to those acquainted with knitting machines, the distances between the lugs or studs on the intermittently moving chain determine the direction of the periods in which the control drum is quiescent.

When stoppage of a knitting machine takes place for a re-adjustment or any other appropriate reason, it is often required to rack the control drum to its starting position before re-starting the machine. Previously, this could only be done by pulling the timing chain round by hand, and a serious disadvantage of this procedure was that, without the exercise of extreme care and caution, the machine would become mis-timed by virtue of the chain lugs or studs of the respectively different heights being incorrectly phased with the positions of the relevant cams or the like on the control drum. In these circumstances, at any particular automatic change a chain lug or stud of the incorrect height might be disposed beneath the toe of the bluff member. If this happened, the control drum would have imparted to it a rack of the wrong extent—with the risk of breakages in, and serious damage to, the head of the machine.

As will be appreciated, this disadvantage arises from the fact that the varying extents to which the control drum is racked, as well as the times when racking is to take place are both determined by the timing chain.

The primary object of the present invention is to enable the varying extents to which the control drum is racked to be automatically determined by the drum itself so that the timing chain can be relieved of this duty and relied on simply to dictate the times when the racks take place. Thus, an important aim is, by the provision of a generally improved and foolproof control mechanism, to preclude the possibility of the machine becoming mistimed.

A further disadvantage of the prior control mechanism is that if it was desired to check the automatic movements of the knitting machine, either during building of the latter or subsequently, the chain had to be racked by hand. This took a considerable time because of the spacing between the chain lugs or studs and hence the idle periods of the control drum.

Accordingly, another object of the invention is to enable the timing chain and the associated bluff member to be temporarily dispensed with, and the control drum to be continuously racked round under power (without idle periods) during rapid checks of these automatic movements. In this way, such a check can be carried out with the production of a minimum number of courses of knitting and hence also with a minimum expenditure of time.

According to this invention, the lugs or studs on the timing chain are of one height only, and the varying extents to which the control drum is racked are automatically determined by a bluff lever independent of the aforementioned chain influenced bluff member, said lever being arranged for action on a part of or on the drum rack pawl and adapted to be controlled by prearranged studs, cams or the like on the control drum itself.

Thus, in the improved control mechanism, the lugs or studs of uniform height on the timing chain merely dictate the time when the drum is to be racked and do not influence the extents of the racks. The arrangement is, in fact, such that whenever the toe of the chain-influenced bluff member is supported on the links of the chain, the operative portion of the said member will, as heretofore, be so disposed as to hold the pawl in a raised position clear of the ratchet wheel so that no racking of the drum can take place, whereas each time the toe is contacted and lifted by one of the chain lugs or studs of uniform height, the chain-influenced bluff member will be turned to release the pawl and so enable the control thereof to be taken over by the drum-controlled bluff lever.

In a convenient embodiment of the invention, the said drum-controlled bluff lever is provided with a suitably contoured cam-like lug for engagement at appropriate time with a laterally extending pin or projection on the drum rack pawl, and also with an adjustable toe-piece at its free end for engagement by the aforementioned studs, cams or the like on the drum.

Figure 2:
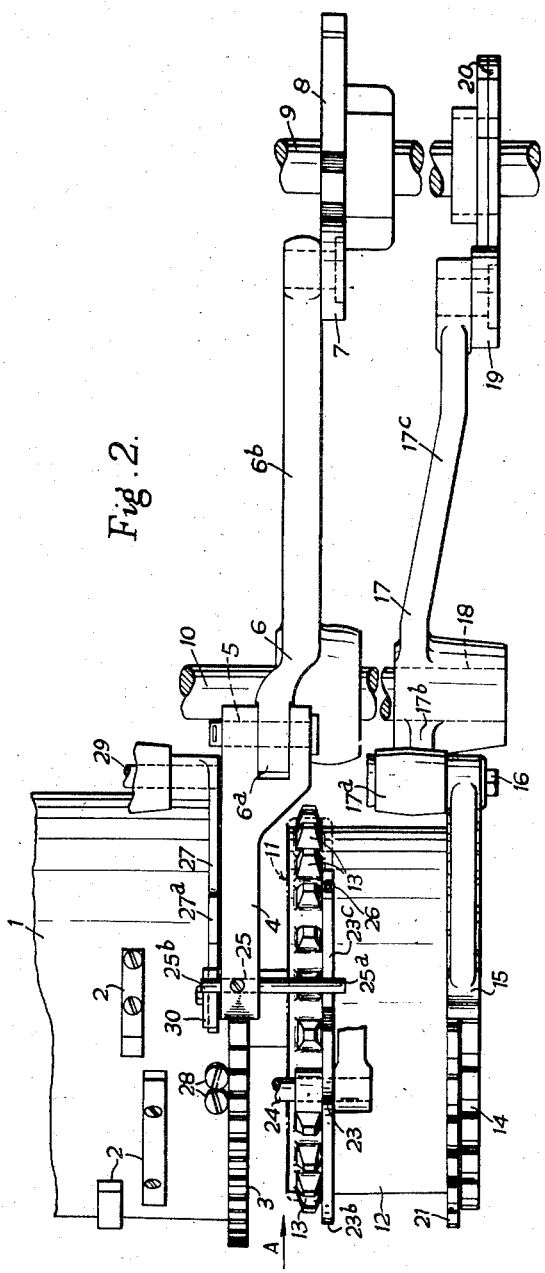
Figure 3:
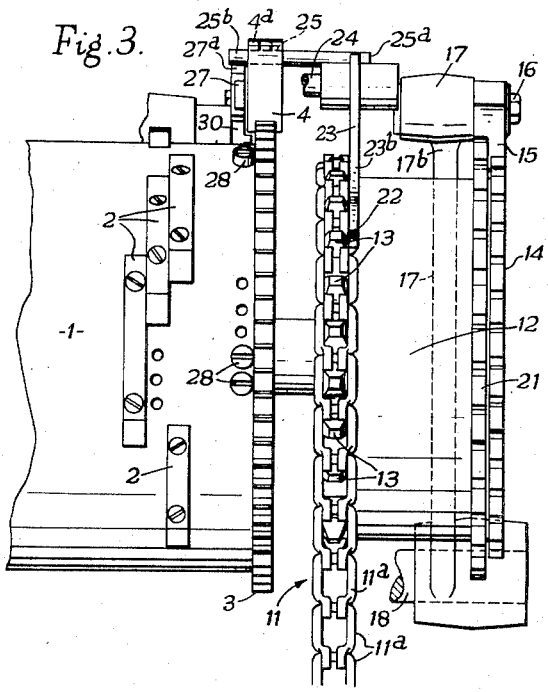
Figure 4:
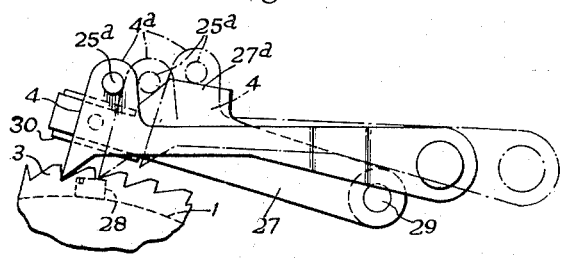

In order that the invention may be more clearly understood and readily carried into practical effect, a specific constructional example of the improved control mechanism will now be described with reference to the accompanying drawings, wherein, Figure 1 is a side view of the said mechanism, Figure 2 is a plan view of the same, Figure 3 is a front view as seen in the direction of the arrow A in Figure 2, and Figure 4 is a detail view illustrating the manner in which the drum-controlled bluff lever controls the rack pawl when the latter is to rack the drum to the extent of a single tooth only.

Like parts are designated by similar reference characters throughout the drawings.

In the drawings, the intermittently rotatable control drum, constituting the main control unit of an automatic knitting machine, is indicated at 1. This drum is fitted with prearranged cams such as 2 (see Figures 2 and 3) from which various components of such machine are automatically actuated in known manner. For racking round the control drum 1 there is provided a peripherally toothed ratchet wheel 3 which is secured to one end of said drum and is arranged to co-operate with a rack pawl 4. This pawl is pivotally mounted upon an axle 5 set in the free end of an upwardly directed arm 6a of a bell crank lever 6 the outer end of the other arm 6b of which is furnished with a roller 7 maintained in contact with a lobe cam 8 rigidly secured upon a continuously rotatable cam shaft 9. As previously explained, this cam shaft is driven in suitable timed relation with the knitting machine. The axle about which the bell crank lever 6 fulcrums when it oscillates is indicated by the reference numeral 10 in Figure 2. Thus, as the cam 2 rotates, the rack pawl 4 reciprocates and functions, as and when permitted, to rack round, i. e. impart intermittent rotation to, the control drum 1.

The mechanism also includes an intermittently movable timing chain 11 which dictates the times when the racks of the drum 1 take place. The said timing chain, the links of which are represented at 11a in Figure 3, is passed over and depends from a chain wheel 12. As will be seen in Figures 1 and 3, the wheel 12 is provided at one end with a circular series of teeth 13 with which the links of the chain 11 are engaged. At its opposite end the said chain wheel 12 has secured thereto a ratchet wheel 14. For co-operation with wheel 14 there is provided a pawl 15 which is pivotally mounted upon an axle 16 set in a boss 17a formed at the upper end of an upwardly directed arm 17b of a second bell crank lever 17. This second lever fulcrums upon and oscillates about an axle 18, and the outer end of the arm 17c of the said lever is furnished with a roller 19 arranged to be acted upon by a continuously rotating cam 20 rigidly secured upon the aforementioned cam shaft 9. Consequently, as the shaft 9 rotates and the drum rack pawl 4 reciprocates, so also does the pawl 15 similarly reciprocate to rack round the chain wheel 12—but again only when permitted to do so. In this last regard, there is mounted upon the chain wheel, immediately adjacent to, and for intermittent rotation independently of, the ratchet wheel 14, a peripherally toothed bluff wheel 21. This bluff wheel is of slightly larger diameter than the ratchet wheel 14 and is itself also arranged to be racked round by the pawl 15. Normally, therefore, the bluff wheel 21 functions to prevent the pawl 15 from acting on and racking round the wheel 14. At one or more locations around its periphery, however, the bluff wheel 21 is deeply gapped, as indicated at 21a in Figure 1, suchwise as to permit the pawl 15 to drop and engage a tooth of the ratchet wheel 14. This is conventional practice and prevents the chain wheel 12 from being continuously racked round, i. e. at every revolution of the cam shaft 9. In this way it is possible to economise in the length of the chain 11.

The timing chain 11, as previously mentioned, dictates only the times when the control drum 1 is to be racked and does not influence the extents of the racks. To this end, predetermined ones of the chain link 11a (the majority of which are plain) are provided with operating lugs, such as that indicated at 22 in Figures 1 and 3, these lugs being of one height only. The lugs 22 are arranged for action on a toe 23a of a bluff member 23 which is located at the outer side of the ratchet wheel 3 and is mounted to turn in a vertical plane about a horizontal fulcrum 24. This chain-influenced bluff member, moreover, is in the form of a two-armed lever, the arms being relatively disposed at an angle. Of these two arms, the arm 23b is provided with the toe 23a whilst the arm 23c is adapted for engagement with an outwardly directed portion 25a of a transversely extending pin 25 fixed in an upstanding lug 4a on the operative end of the drum rack pawl 4. As will be seen more clearly in Figures 2 and 3, the pin 25 projects laterally from the outer side of the pawl 4, at right angles thereto, into the path of the arm 23c of the chain-influenced bluff member 23. The last mentioned member is controlled by a tension spring 26 (Figure 1). Thus, whenever the toe 23a is supported in the normal way upon plain links 11a of the chain 11, the arm 23c will be so disposed as to hold the drum rack pawl 4 in a raised position clear of the ratchet wheel 3. On the other hand, each time the toe 23a is lifted by one of the chain lugs 22 of the uniform height, the bluff member 23 will be turned against the action of the spring 26 to release the pawl 4 and permit it to engage the ratchet wheel 3.

In accordance with this invention the varying extents of the racks of the control drum 1 are automatically determined by the said drum itself. To this end there is provided a bluff lever 27, independent of the chain-influenced bluff member 23, this lever, which is formed on its upper edge with a suitably contoured cam-like lug 27a is provided for action on a portion 25b of the pin 25 projecting laterally from the inner side of the drum rack pawl 4, being adapted to be controlled by prearranged control studs 28 fixed on the drum 1. A single circular series of the studs 28, suitably spaced apart, is mounted on the said drum immediately adjacent to the inner side of the ratchet wheel 3. The bluff lever 27 is mounted to turn freely in a vertical plane about a horizontally disposed fixed axle 29 and at its free end is provided with an adjustable toe-piece 30 for contact with the studs 28.

It is principally the intention that for all normal practical purposes, the improved control mechanism shall be designed to rack the control drum 1 to two extents only, i. e. to the extent of either a single or a double rack, for which purpose the prearranged studs 28 on the drum would all be of the same height. In this preferred and illustrated form of the mechanism, whenever the drum rack pawl 4 is released by the chain-influenced bluff member 23 for control by the drum-controlled bluff lever 27 the toe-piece 30 at the free end of the latter will be supported either upon one of the drum studs 28 or upon the surface of the drum. In the former case, the bluff lever 27 will be supported in the raised position depicted in Figure 4 so that when the pawl 4 makes its forward stroke the laterally extending portion 25b of the pin 25 fixed in the pawl will ride over the contoured cam-like lug 27a with the result that half of this operative stroke will have been made before the pawl 4 is lowered and allowed to engage behind a tooth of the ratchet wheel 3; as a consequence the pawl 4 will take only one tooth and impart to the drum a single rack, all as will be clear from a consideration of Figure 4. In the latter case, however, the bluff lever 27 will be in a low position with its contoured cam-like lug 27a below and out of the path of the portion of the pin 25 so that the tip of the pawl 4 will be behind a ratchet tooth at the commencement of an operative stroke and the pawl will take two teeth and impart to the drum a double rack.

It is, however, also within the scope of the invention to provide a form of the improved control mechanism which will be capable of racking the drum to three or even more different extents, according to requirements: in this case there would be provided on the control drum for controlling the bluff lever 27 studs, cams or the like of two or more different heights.

All that is necessary to carry out a rapid check of automatic movements of the knitting machine, under power, is to lift the toe 23a of the bluff member 23 associated with the timing chain 11 and temporarily hold this member out of action. This, of course, releases the drum rack pawl 4 which is then influenced by the control drum only. As a consequence, the drum will be continuously racked, and the automatic changes will be effected in quick succession, without idle periods between the changes. Meanwhile the timing chain 11 will continue to move idly, and when the drum has been racked round to its starting position it will be necessary to re-set the chain to a corresponding position. But even if, in doing this, the chain was inadvertently misplaced, the chain lugs or studs of uniform height could do no damage because the varying racks are determined by the control drum and not by the timing chain. The fact that the drum studs 28 controlling the bluff lever 27 are fixed in relation to the drum cams 2 effecting the required automatic changes precludes the possibility of damage to the head of the machine.

The ratchet wheel 3 secured to the drum 1 may conveniently be provided with teeth of different circumferential extents suitably prearranged around the wheel according to requirements. For instance, a double tooth may be produced by securing a filler piece in the space between two single teeth. Alternatively, the ratchet wheel 3 may initially be cut with teeth of the required varying extents.

I claim:

1. In an automatic knitting machine, a control mechanism comprising, in combination, a main control drum, a peripherally toothed ratchet wheel secured to said drum, a rack pawl arranged to co-operate with said wheel, means functioning to reciprocate said pawl and so rack round the control drum, prearranged cams on said drum from which automatically operated parts of the machine are actuated, a timing chain which consists of a succession of connected links and from which racking movements of the drum are initiated at required times, means moving said chain intermittently, lugs on pre-arranged links of the timing chain, a movable bluff member which controls engagement of the pawl with the ratchet wheel and is influenced by the lugs on the chain, said lugs being all of one height so that they are only capable of dictating the times when the control drum is to be racked, a bluff lever independent of the chain-influenced bluff member, prearranged studs on the control drum for controlling the said independent bluff lever, and a part on the drum rack pawl for engagement by said bluff lever in such a way that the latter automatcially determines varying extents to which said drum is racked.

2. A control mechanism according to claim 1, wherein the drum-controlled bluff lever is provided with a contoured lug for engagement at appropriate times with a laterally extending pin on the drum rack pawl.

3. A control mechanism according to claim 1, wherein the drum-controlled bluff lever is provided at its free end with an adjustable toe-piece for engagement by the studs on the control drum.

4. A control mechanism according to claim 1, wherein the prearranged studs on the control drum are all of the same height and the mechanism is thereby adapted to rack the control drum to two extents only.

5. In an automatic knitting machine, a control mechanism comprising, in combination, a main control drum, a peripherally toothed ratchet wheel secured to said drum, a rack pawl arranged to co-operate with said wheel, means functioning to reciprocate said pawl and so rack round the control drum, prearranged cams on said drum from which automatically operated parts of the machine are actuated, a timing chain which consists of a succession of connected links and from which racking movements of the drum are initiated at required times, means moving said chain intermittently, lugs on prearranged links of the timing chain, a movable bluff member which controls engagement of the pawl with the ratchet wheel and is influenced by the lugs on the chain, said lugs being all of one height so that they are only capable of dictating the times when the control drum is to be racked, a bluff lever independent of the chain-influenced bluff member, said lever being provided with a contoured lug, prearranged studs of uniform height on the control drum for controlling the said independent bluff lever, a laterally extending pin fixed in the drum rack pawl for engagement by said bluff lever whereby when said rack pawl is released by the chain-influenced bluff member for control by the drum-controlled bluff lever and the latter is engaged by a stud on the drum, the said bluff lever is supported in a raised position so that when the rack pawl makes a forward stroke the laterally extending pin fixed therein rides over the contoured lug with the result that half this operative stroke is made before the pawl is lowered and allowed to engage behind a tooth of the ratchet wheel as a consequence of which the pawl imparts to the drum a rack to the extent of one tooth only, whereas when the pawl is released and the free end of the drum-controlled bluff lever is resting on the surface of the control drum, the said lever is disposed in a low position with its contoured lug clear of the path of the pin in the rack pawl so that the tip of the latter is behind a tooth on the ratchet wheel at the commencement of an operative stroke so that a rack to the extent of two teeth is imparted to the drum.

6. In an automatic knitting machine, a control mechanism comprising, in combination, a main control drum, a peripherally toothed ratchet wheel secured to said drum, a rack pawl arranged to co-operate with said wheel, means functioning to reciprocate said pawl and so rack round the control drum, prearranged cams on said drum from which automatically operated parts of the machine are actuated, a timing chain which consists of a succession of connected links and from which racking movements of the drum are initiated at required times, means moving said chain intermittently, lugs on prearranged links of the timing chain, a movable bluff member which controls engagement of the pawl with the ratchet wheel and is influenced by the lugs on the chain, said lugs being all of one height so that they are only capable of dictating the times when the control drum is to be racked, a bluff lever independent of the chain-influenced bluff member, prearranged studs on the control drum for controlling the said independent bluff lever, a part on the drum rack pawl for engagement by said bluff lever in such a way that the latter automatically determines varying extents to which said drum is racked, the chain-influenced bluff member being manually disengageable from the timing chain and adapted to be temporarily held out of action suchwise as to release the drum rack pawl for control from the drum only and permit said drum to be continuously racked for carrying out a rapid check of automatic movements of the knitting machine under power.

7. In an automatic knitting machine, a control mechanism comprising, in combination, a main control drum, a peripherally toothed ratchet wheel secured to said drum, a rack pawl arranged to co-operate with said wheel, a transversely extending pin which is fitted in the rack pawl and projects laterally from opposite sides thereof, means functioning to reciprocate said pawl and so rack round the control drum, prearranged cams on said drum from which automatically operated parts of the machine are actuated, a timing chain which consists of a succession of connected links and from which racking movements of the drum are initiated at required times, means moving said chain intermittently, lugs on prearranged links of the timing chain, a movable bluff member which is arranged for action upon the portion of the aforesaid pin at one side of the rack pawl for controlling engagement of said pawl with the ratchet wheel and is influenced by the lugs on the chain, said lugs being all of one height so that they are only capable of dictating the times when the control drum is to be racked, a bluff lever which is independent of the chain-influenced bluff member and has provided thereon a cam-like formation for engagement at appropriate times with the portion of the pin at the opposite side of the rack pawl for the purpose of automatically determining the varying extents to which the said drum is racked, and prearranged studs on the drum for controlling said independent bluff lever.

8. A control mechanism according to claim 7, wherein the chain-influenced bluff member is biassed and is in the form of a two-armed lever the arms of which are relatively disposed at an angle, one of these arms having a toe for engagement by the chain lugs and the other being adapted for engagement with the appropriate portion of the pin fixed in the drum rack pawl.

9. In an automatic knitting machine, a control mechanism comprising, in combination, a main control drum, a peripherally toothed ratchet wheel secured to said drum, a rack pawl arranged to co-operate with said wheel, a continuously rotating lobe cam driven in timed relation with the knitting machine, a bell crank lever which is coupled to the rack pawl and is arranged to be actuated by said lobe cam whereby said pawl is reciprocated to rack round the control drum, prearranged cams on said drum from which automatically operated parts of the machine are actuated, a movable timing chain consisting of a succession of connected links and from which racking movements of the drum are initiated at required times, a toothed chain wheel over which the said chain is passed, a second ratchet wheel secured to said wheel, a second pawl for co-operating with said second ratchet wheel, a rotary cam rotating together with the aforesaid lobe cam, a second bell crank lever which is coupled to said second pawl and is arranged to be actuated by the rotary cam whereby the chain wheel is racked round to move the timing chain intermittently, lugs on prearranged links of the timing chain, a movable bluff member which controls engagement of the first mentioned pawl with the ratchet wheel on the drum and is influenced by the lugs on the chain, said lugs being all of one height so that they are only capable of dictating the times when the control drum is to be racked, a bluff lever independent of the chain-influenced bluff member, prearranged studs on the control drum for controlling the said independent bluff lever, and a part on the drum rack pawl for engagement by said bluff lever in such a way that the latter automatically determines varying extents to which said drum is racked.

No references cited.